(12) United States Patent
Fukuda

(10) Patent No.: US 8,174,644 B2
(45) Date of Patent: May 8, 2012

(54) LIQUID CRYSTAL MODULE

(75) Inventor: Yutaka Fukuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 199 days.

(21) Appl. No.: 12/792,210

(22) Filed: Jun. 2, 2010

(65) Prior Publication Data

US 2010/0309408 A1 Dec. 9, 2010

(30) Foreign Application Priority Data

Jun. 5, 2009 (JP) .............................. P. 2009-135749

(51) Int. Cl.
*G02F 1/1333* (2006.01)
(52) U.S. Cl. ................. 349/67; 349/58; 349/70
(58) Field of Classification Search ...................... 349/67
See application file for complete search history.

(56) References Cited

U.S. PATENT DOCUMENTS

| | | | |
|---|---|---|---|
| 7,522,249 B2 * | 4/2009 | Matsuzaki et al. ............ | 349/149 |
| 2005/0265020 A1 | 12/2005 | Kim | |
| 2006/0215386 A1 | 9/2006 | Hatanaka et al. ................ | 362/29 |
| 2008/0316387 A1 | 12/2008 | Kawada ........................ | 349/58 |
| 2008/0316389 A1 | 12/2008 | Zensai ........................... | 349/58 |

FOREIGN PATENT DOCUMENTS

| EP | 2 006 603 A1 | 12/2008 |
|---|---|---|
| EP | 2 045 653 A1 | 4/2009 |
| JP | 2005-322645 | 11/2005 |

\* cited by examiner

*Primary Examiner* — Richard Kim
(74) *Attorney, Agent, or Firm* — Morgan, Lewis & Bockius LLP

(57) ABSTRACT

A liquid crystal module is provided. A light reflective sheet is provided on a bottom plate of a rear frame. A cold cathode tube is provided on the light reflective sheet in the rear frame. A pair of left and right covers which are made of the light reflective sheet are disposed inside left and right side plates of the rear frame to cover over both end portions of the cold cathode tube. Each of the covers includes an inclined sheet portion inclined downwardly toward the inside of the rear frame; an upper edge portion bent outwardly from an upper end of the inclined sheet portion; and a insertion piece protruded inwardly from a lower end of the inclined sheet portion. The upper edge portion is mounted on a support plate portion provided in an upper end of each of the left and right side plates of the rear frame and fixed to the support plate portion with a fixture. The insertion piece is inserted and fixed between the bottom plate of the rear frame and the light reflective sheet through a cut portion formed at each of left and right end portions of the light reflective sheet.

9 Claims, 8 Drawing Sheets

LIQUID CRYSTAL MODULE

The disclosure of Japanese Patent Application No. 2009-135749 filed on Jun. 5, 2009 including specification, drawings and claims is incorporated herein by reference in its entirety.

BACKGROUND

The present invention relates to a liquid crystal module to be installed in an electronic device such as a television, a personal computer, or the like. More particularly, the present invention relates to a liquid crystal module which is capable of lowering costs and improving brightness at both left and right side portions of a display surface by attaching a cover made of a light reflection sheet which is inexpensive and superior in light reflectivity, instead of a lamp frame made of synthetic resin, with an appropriate fixing structure for covering and concealing end portions of a cold cathode tube.

A related-art liquid crystal module has a fixing structure in which a light reflective sheet and a cold cathode tube are disposed in a rear frame, lamp frames made of synthetic resin are arranged inside left and right side plates of the rear frame for covering and concealing end portions of the cold cathode tube, left and right edge portions of an optical sheet are inserted into a groove portion of the lamp frames, upper and lower edge portions of the optical sheet are mounted on upper and lower side plates of the rear frame and pressed by cell guides, and four circumferential edges of a liquid crystal panel are mounted on the lamp frames and cell guides and enclosed and fixed by a bezel.

The lamp frame is used in the related-art liquid crystal module for covering and concealing end portions of the cold cathode tube to prevent variation in brightness at both left and right side portions of a display surface of the liquid crystal panel and for reflecting light from the cold cathode tube to prevent deterioration in brightness at both left and right side portions of the display surface. The lamp frame is made of white synthetic resin having good light reflectivity and is formed by injection molding.

Patent Document 1 disclose a display device in which left and right light reflective sheets are disposed inside left and right side plates of a box-shaped fixing member to cover and conceal end portions of a cold cathode tube, and a plurality of protrusions formed at lower end portions of the left and right light reflective sheets are adhered to, by an adhesive or double-sided tape, a plurality of uprising pieces at both left and right end portions of the light reflective sheet which is provided at a bottom surface of the fixing member. Patent Document 1 also discloses a display device in which tip ends of the protrusions formed at the lower end portions of the left and right light reflective sheets are inserted into a plurality of grooves formed in left and right edge portions of the light reflective sheet which is provided at the bottom surface of the fixing member.

Patent Document 1: JP-A-2005-322645

In the related-art liquid crystal module in which the lamp frame made of white synthetic resin is mounted, since such lamp frame is expensive, it is difficult to satisfactorily fulfill the requirement for lowering the manufacturing costs of recent liquid crystal televisions. Although the lamp frame made of the white synthetic resin has good light reflectivity, the light reflectivity of the lamp frame is lower than that of the light reflective sheet. Accordingly, there is room for further improvement in the brightness at both left and right side portions of the display surface of liquid crystal panel in the related-art liquid crystal module.

The display device disclosed in Patent Document 1 in which the protrusions formed at the lower end portions of the left and right light reflective sheets are adhered to, by the adhesive or the double-sided tape, the uprising pieces at the left and right end portions of the light reflective sheet which is provided at the bottom surface of the fixing member, or in which the tip ends of the protrusions formed at the lower end portions of the left and right light reflective sheets are inserted into the grooves formed in the left and right edge portions of the light reflective sheet which is provided at the bottom surface of the fixing member, has a problem in that assembly workability is not good. In particular, the latter device in which the tip ends of the protrusion are inserted into the grooves of the light reflective sheet has a problem in that the left and right light reflective sheets are easily detached from the light reflective sheet in the bottom surface. In addition, in the display device disclosed in Patent Document 1, the upper edges of the left and right light reflective sheets are merely overlapped with the upper surfaces of the left and right side plates of the fixing member without using special fixing means. Accordingly, the upper edges of the left and right light reflective sheets may be easily detached from the left and right side plates of the fixing member.

SUMMARY

It is therefore an object of at least one embodiment of the present invention to provide a liquid crystal module capable of lowering costs and improving brightness at both left and right side portions of a display surface, and improving the assembly workability, by attaching a cover made of light reflection sheet which is inexpensive and superior in light reflectivity, instead of a lamp frame made of synthetic resin, with an appropriate fixing structure for covering and concealing end portions of a cold cathode tube.

In order to achieve the above described object, according to an aspect of at least one embodiment of the present invention, there is provided a liquid crystal module, comprising: a rear frame; a light reflective sheet provided on a bottom plate of the rear frame; a cold cathode tube provided on the light reflective sheet in the rear frame; a pair of left and right covers made of the light reflective sheet and disposed inside left and right side plates of the rear frame to cover over both end portions of the cold cathode tube, wherein each of the covers includes: an inclined sheet portion inclined downwardly toward the inside of the rear frame; an upper edge portion bent outwardly from an upper end of the inclined sheet portion; and a insertion piece protruded inwardly from a lower end of the inclined sheet portion, wherein the upper edge portion is mounted on a support plate portion provided in an upper end of each of the left and right side plates of the rear frame and fixed to the support plate portion with a fixture, and wherein the insertion piece is inserted and fixed between the bottom plate of the rear frame and the light reflective sheet through a cut portion formed at each of left and right end portions of the light reflective sheet.

The fixture (first fixture) may includes a protrusion piece protruded upwardly from the support plate portion of the rear frame and a rectangular hole formed on the upper edge portion of the covers, and the protrusion piece may be inserted into the rectangular hole from below so that the upper edge portion of the covers is fixed to the support plate portion of the rear frame. The length of a short side of the rectangular hole may be slightly smaller than the thickness of the protrusion piece so that the protrusion piece is press-fitted into the rectangular hole from below. The rectangular hole may be provided with notches extending in a short side direction of the rectangular hole from both ends of the rectangular hole in a long side direction of the rectangular hole.

The fixture (second fixture) may include a protrusion piece protruded upwardly from the support plate portion of the rear frame and a concave cutout portion formed at outer end of the upper edge portion of the covers, and the protrusion piece may be fitted into the concave cutout portion so that the upper edge portion of the covers is fixed to the support plate portion of the rear frame. The width of the concave cutout portion may be slightly smaller than the width of the protrusion piece so that the protrusion piece is press-fitted into the concave cutout portion. Both sides of an opened end of the concave cutout portion may be chamfered for fitting the protrusion piece into the concave cutout portion.

The fixture (third fixture) may include a rectangular opening formed in the support plate portion of the rear frame and a tub piece formed in the upper edge portion of the covers by forming a slit portion at the upper edge portion of the covers, the slit portion extending in a longitudinal direction of the upper edge portion and having both ends bent outwardly, and the tub piece may be inserted below the support plate portion of the rear frame through the rectangular opening so that the upper edge portion of the covers is fixed to the support plate portion of the rear frame.

The liquid crystal module may further comprise: an optical sheet overlapped with the upper edge portion of the covers; a spacer provided on left and right edge portions of the optical sheet; and a liquid crystal panel overlapped with the optical sheet through the spacer. The support plate portion of the rear frame may be provided with a first uprising piece and the upper edge portion of the covers is provided with a second uprising piece overlapped with an inner surface of the first uprising piece and the liquid crystal panel may positioned in left and right direction by the first uprising piece through the second uprising piece.

In the above described liquid crystal module, since the covers made of the light reflective sheet and provided inside the left and right side plates of the rear frame cover over the both end portions of the cold cathode tube, it is possible to prevent variation in brightness at both left and right side portions of the display surface of the liquid crystal panel. Since the cover made of the light reflective sheet costs significantly less than the lamp frame in the related art, it is possible to lower the manufacturing costs of the liquid crystal module. Moreover, since the light reflective property of the cover is higher than that of the lamp frame made of white synthetic resin, it is possible to improve the brightness at both left and right side portions of the display surface of the liquid crystal panel by effectively reflecting the light emitted from the cold cathode tube toward both left and right side portions of the rear surface of the liquid crystal panel by using the inclined sheet portion of the cover.

In addition, in the above described liquid crystal module, the lower end portion of the cover is fixed to the rear frame by inserting the insertion pieces of the cover between the bottom plate of the rear frame and the light reflective sheet through a cut portion formed at each of left and right end portions of the light reflective sheet. It is very easy to fix the lower end portion of the cover and it is possible to reliably fix the lower end portion of the cover. Further, by using the first to third fixture, it is also very easy to reliably fix the upper edge portion of the cover to the support plate portion of the rear frame. Accordingly, it is possible to improve the fixing (assembly) workability and there is no concern that the cover may be detached from the rear frame.

In the first fixture, since the length of a short side of the rectangular hole is slightly smaller than the thickness of the protrusion piece so that the protrusion piece is press-fitted into the rectangular hole from below, it is possible to increase the fixing strength so as to prevent the protrusion piece from being released from the rectangular hole. Since the rectangular hole is provided with notches extending in a short side direction of the rectangular hole from both ends of the rectangular hole in a long side direction of the rectangular hole, it is easy to insert the protrusion piece into the rectangular frame and it is possible to firmly fixing the upper edge portion of the cover to the support plate portion of the rear frame to prevent the protrusion piece from being released from the rectangular hole after the press-fitting.

In the second fixture, since the width of the concave cutout portion is slightly smaller than the width of the protrusion piece so that the protrusion piece is press-fitted into the concave cutout portion, it is possible to increase the fixing strength so as to prevent the protrusion piece from being released from the concave cutout portion. Since the both sides of the opened end of the concave cutout portion is chamfered for fitting the protrusion piece into the concave cutout portion, the protrusion piece can be smoothly fitted into the concave cutout portion through chamfered portions, thereby it is easy to fitting the protrusion piece to the concave cutout portion.

In addition, in a case where the support plate portion of the rear frame is provided with a first uprising piece and the upper edge portion of the covers is provided with a second uprising piece overlapped with an inner surface of the first uprising piece so that the liquid crystal panel is positioned in left and right direction by the first uprising piece through the second uprising piece, since the edge portions (the end surfaces) of the liquid crystal panel does not come into direct contact with the first uprising piece which is made of sheet metal, it is possible to prevent the edge portions (the end surfaces) of the liquid crystal panel from being damaged by the first uprising piece. In addition, since the liquid crystal panel overlapped with the optical sheet through the spacer which is provided on left and right edge portions of the optical sheet, it is possible to prevent the emitted light from leaking from the left and right edge portions of the liquid crystal panel.

DETAILED DESCRIPTION OF THE EMBODIMENTS

Figure 1:
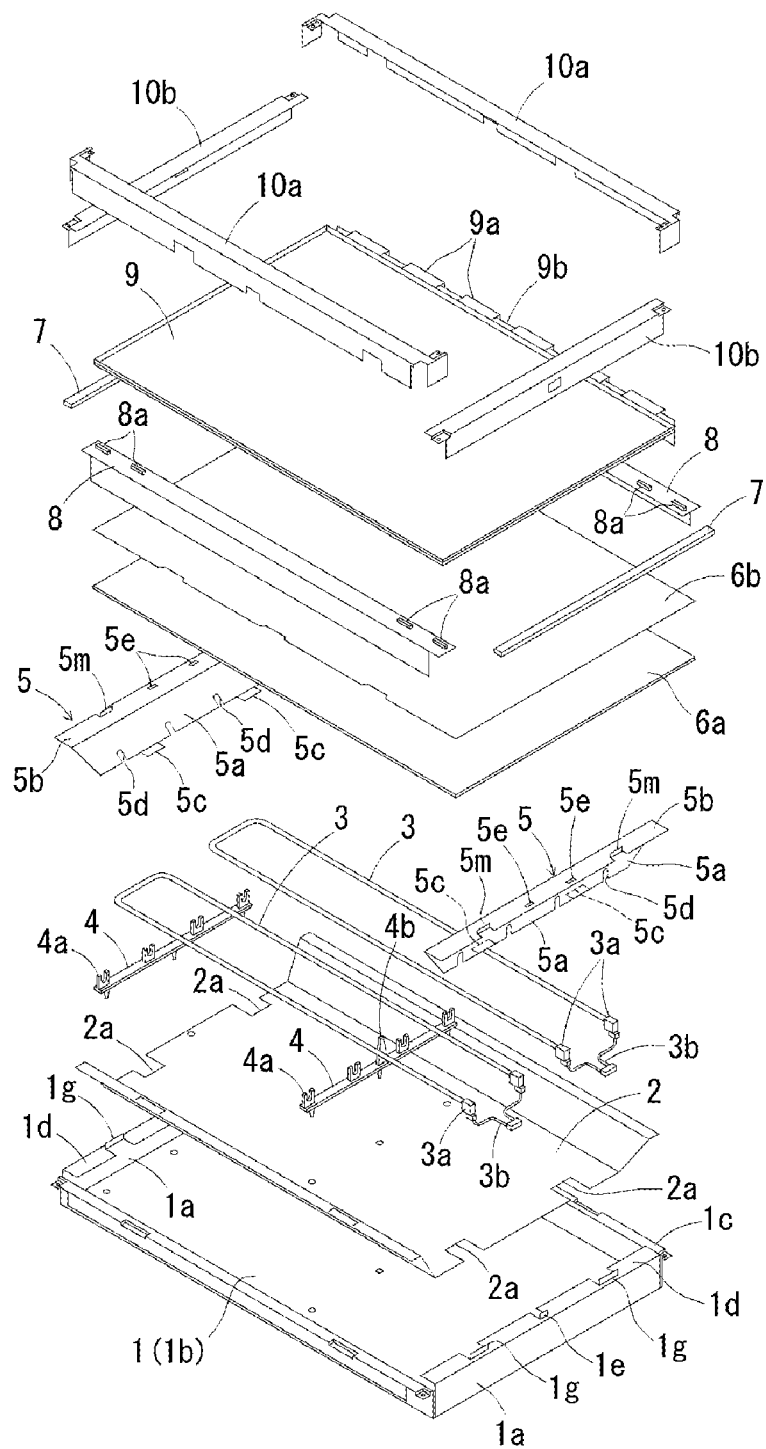
FIG. 1 is an exploded perspective view illustrating a liquid crystal module according to an embodiment of the present invention.
Figure 2:
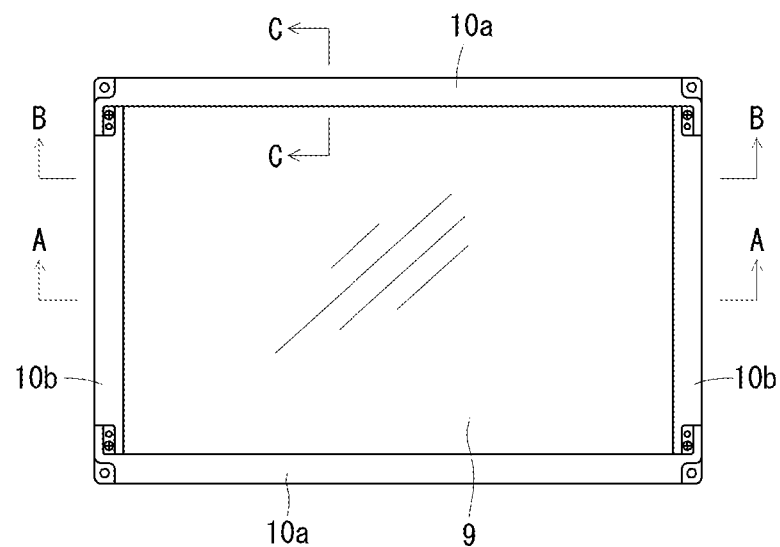
FIG. 2 is a top plan view illustrating the liquid crystal module.

A liquid crystal module shown in FIGS. 1 to 5 includes a rear frame 1, a light reflective sheet 2, U-shaped cold cathode tubes 3, lamp holders 4, covers 5 made of light reflective sheets, optical sheets 6a and 6b, spacers 7, cell guides 8, a liquid crystal panel 9, bezels 10a and 10b.

Explaining the outline of the whole configuration of this liquid crystal module, the rear frame 1 is a shallow box-type rear frame formed by bending a sheet metal, and the light reflective sheet 2 is provided in the rear frame 1. A plurality (two in this embodiment) of U-shaped cold cathode tubes 3 are arranged in parallel with each other on the light reflective sheet 2. The U-shaped cold cathode tubes 3 are supported by a plurality (two in this embodiment) of lamp holders 4. The lamp holder 4 is provided with holding portions 4a which fixes and holds the U-shaped cold cathode tube 3, as shown in FIG. 1. The lamp holders 4 holding center portions of the U-shaped cold cathode tubes 3 are provided with posts 4b supporting the optical sheet 6a from below to prevent bending of the optical sheet 6a.

Lamp sockets 3a are attached to end portions of the U-shaped cold cathode tubes 3. The lamp sockets 3a are fixed into socket opening portions (not shown) which are provided in a bottom plate 1b of the rear frame 1 along one of the left and right side plates 1a (along the right side plate 1a in this embodiment) of the rear frame 1. A lead wire 3b of the U-shaped cold cathode tube 3 is drawn out from each of the lamp sockets 3a toward a rear side of the rear frame 1.

Figure 3:
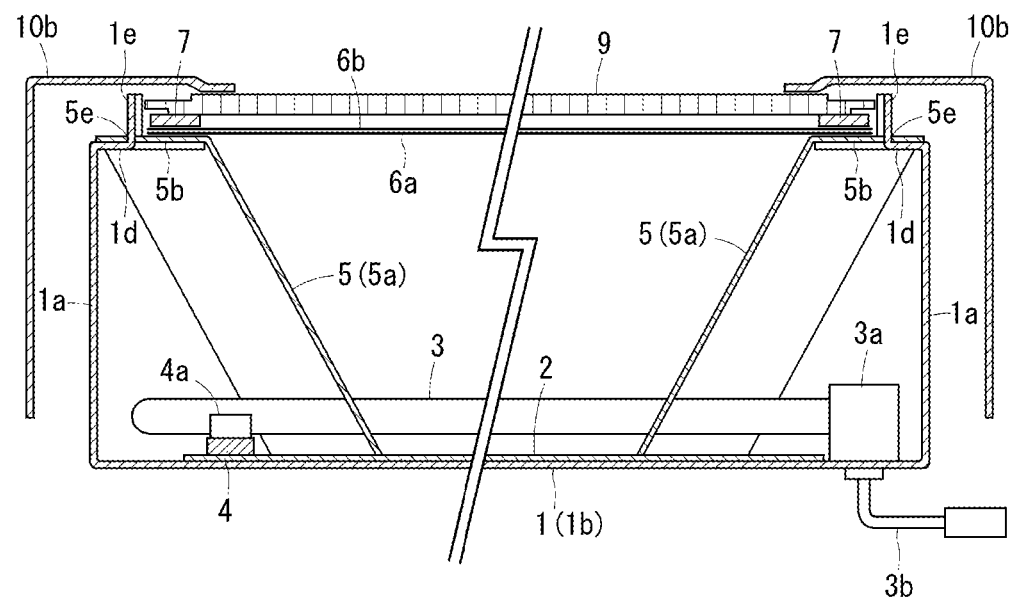
FIG. 3 is a cross-sectional view taking along the line A-A in FIG. 2.
Figure 4:
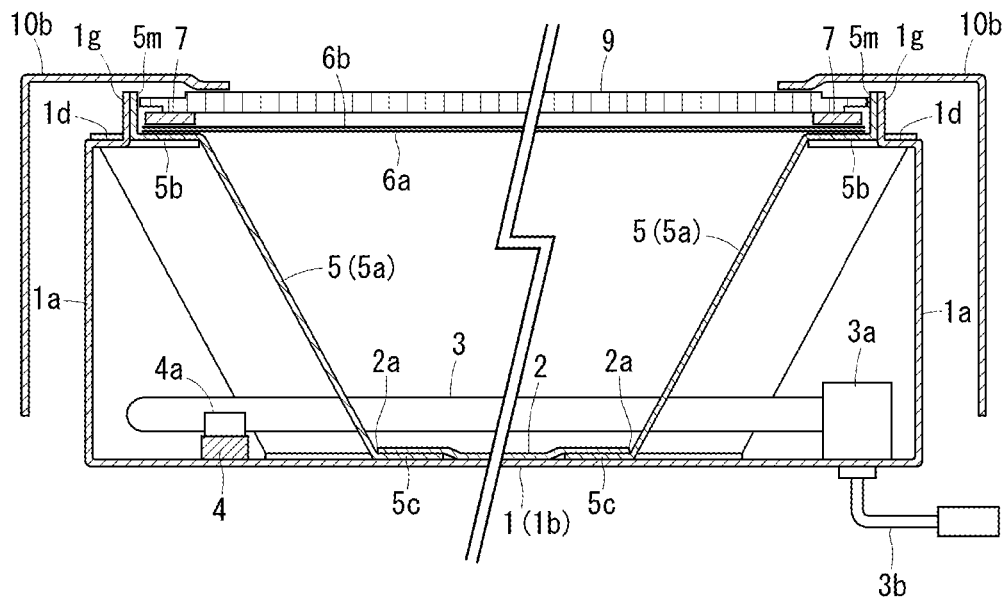
FIG. 4 is a cross-sectional view taking along the line B-B in FIG. 2.

As shown in FIGS. 3 and 4, both ends of the U-shaped cold cathode tube 3 are covered by the covers 5 made of a light reflective sheet and disposed inside left and right side plates 1a of the rear frame 1 to prevent variation in brightness from occurring at both left and right side portions of the display surface of the liquid crystal panel 9 and to improve the brightness at both left and right side portions of the display surface. The shape and attaching structure of the covers 5 will be described in detail later.

Figure 5:
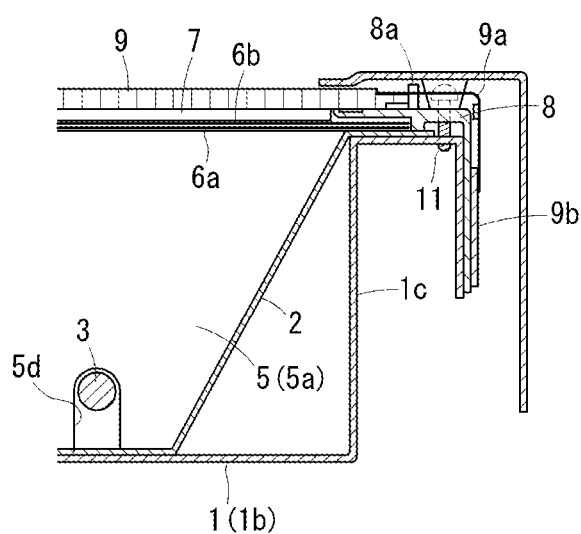
FIG. 5 is a cross-sectional view taking along the line C-C in FIG. 2.

As shown in FIGS. 1, 3 and 4, the left and right edge portions of the optical sheets 6a and 6b are overlapped with the upper edge portions 5b of the covers 5 and left and right edge portions of the liquid crystal panel 9 are overlapped thereon with the band-shaped spacers 7 having a light shielding property interposed therebetween. As shown in FIGS. 1 and 5, the upper and lower edge portions of the optical sheets 6a and 6b are overlapped with the upper and lower side plates 1c (double side plates bent in a reversed U-shape) of the rear frame 1 and are pressed by the cell guides 8. The upper and lower edge portions of the liquid crystal panel 9 are disposed on the cell guides 8. Four peripheral edges of the liquid crystal panel 9 and four peripheral side plates of the rear frame 1 are enclosed by two long-side bezels 10a and two short-side bezels 10b which are made of sheet metals and are connected in the shape of a rectangular frame. These bezels 10a and 10b are fixed to the double-side plates 1c of the rear frame 1 by screws 11 (see FIG. 5).

The optical sheets 6a and 6b are light diffuser sheets for diffusing the light emitted from the U-shaped cold cathode tubes 3 and uniformly irradiating it onto the liquid crystal panel 9. The upper optical sheet 6b is a thin light diffuser sheet and the lower optical sheet 6a is a panel-type light diffuser sheet (light diffusing plate) having a thickness sufficient enough to prevent it from bending. In addition, as shown in FIGS. 1 and 5, an X-wiring board 9b is connected to the upper edge of the liquid crystal panel 9, with a chip-on film 9a interposed therebetween, and the X-wiring board 9b is fixed to the side surface of the cell guide 8.

Figure 6:
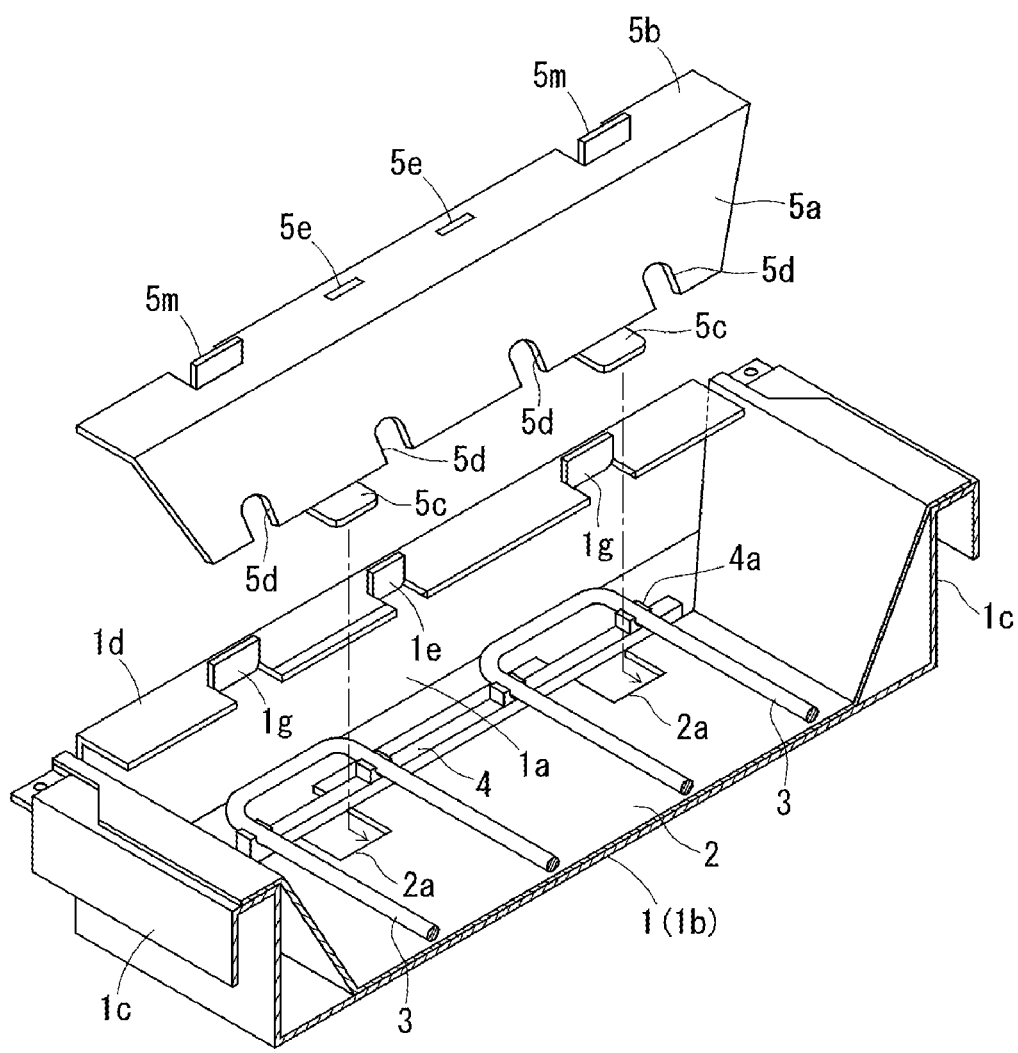
FIG. 6 is a partial exploded perspective view illustrating a rear frame to which a light reflective sheet and a cold cathode tube are attached, and a cover made of a light reflective sheet.
Figure 7:
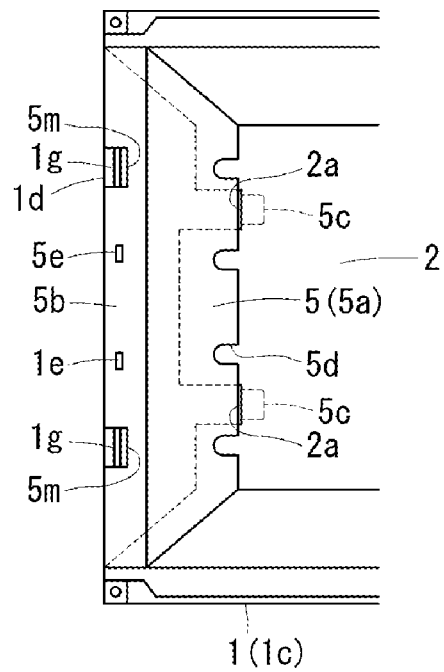
FIG. 7 is a partial top plan view illustrating the rear frame to which the light reflective sheet and the cover made of the light reflective sheet are attached.

The cover 5 is made of the same light reflective sheet as the light reflective sheet 2 provided on the bottom plate 1b of the rear frame 1. This light reflective sheet is formed by laminating an aluminum deposited film on a surface of a substrate sheet, is inexpensive and has excellent light reflectivity. As shown in FIGS. 3, 4 and 6, each cover 5 includes an inclined sheet portion 5a which is inclined downwardly toward the inside of the rear frame 1, an upper edge portion 5b bent outwardly from an upper end of the inclined sheet portion 5a, and two rectangular insertion pieces 5c protruded inwardly from a lower end of the inclined sheet portion 5a. The lower end of the inclined sheet portion 5a is provided with a plurality (four in this embodiment) of concave portions 5d through which the U-shaped cold cathode tubes 3 are inserted.

The lower end of the cover 5 is fixed to the rear frame 1 by inserting the insertion pieces 5c between the bottom plate 1b of the rear frame 1 and the light reflective sheet 2 through two rectangular cut portions 2a formed at both left and right end portions of the light reflective sheet 2 which is provided at the bottom plate 1b of the rear frame 1, as shown in FIGS. 1, 4, 6 and 7.

Figure 8:
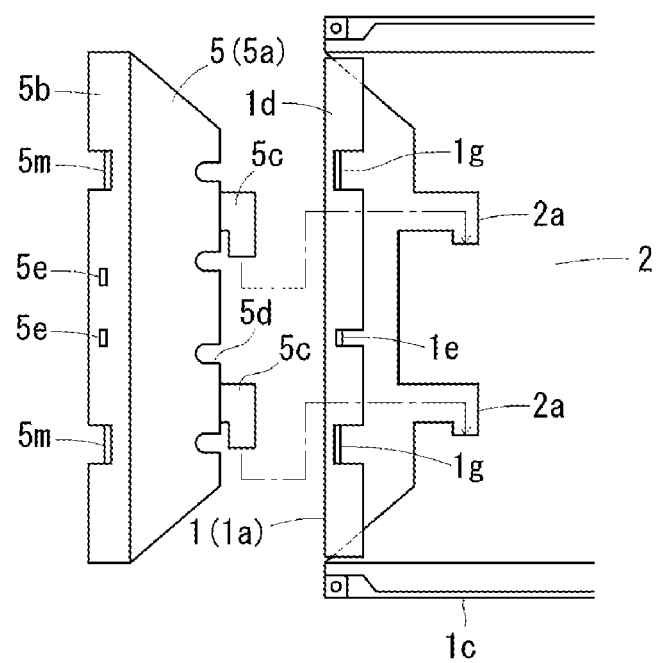
FIG. 8 is a partial exploded top plan view illustrating the rear frame to which another light reflective sheet is attached, and a cover made of another light reflective sheet.

The insertion piece 5c and the cut portion 1e are not limited to the above-mentioned rectangular shape. For example, as shown in FIG. 8, hook-shaped insertion pieces 5c and hook-shaped cut portions 2a may be provided. The lower end of the cover 5 may be fixed to the rear frame 1 by inserting the hook-shaped insertion pieces 5c between the bottom plate 1b of the rear frame 1 and the light reflective sheet 2 in a bending direction of a hook shape through the cut portions 2a.

In addition, the upper edge portion 5b of the cover 5 is fixed to support plate portions 1d which are bent inwardly at a right angle from the upper edges of the left and right side plates 1a of the rear frame 1 by a first fixing means which will be described below. As shown in FIG. 6, a protruding piece 1e constituting the first fixing means is formed on the support plate portion 1d of the rear frame 1. The protruding piece 1e is disposed at a position shifted from a center to one side in a longitudinal direction of the support plate portion 1d and protruded upwardly from the support plate portion 1d. The protruding piece 1e is formed by cutting a portion of the support plate portion 1d and upwardly bent the cut portion. In addition, a rectangular hole 5e constituting the first fixing means and corresponding to the protruding piece 1e is formed in the upper edge portion 5b of the cover 5. The protruding piece 1e is inserted into the rectangular hole 5e from below so that the upper edge portion 5b of the cover is fixed to the support plate portion 1d of the rear frame 1. In this embodiment, two rectangular holes 5e are formed at symmetric positions shifted from a center to both sides in a longitudinal direction of the upper edge portion 5b of the cover 5. With this configuration, the left and right covers 5 can be formed in the same shape with each other and thus an attachment error of the left and right covers 5 to the left and right side plates 1a of the rear frame 1 can be prevented.

Figure 9:
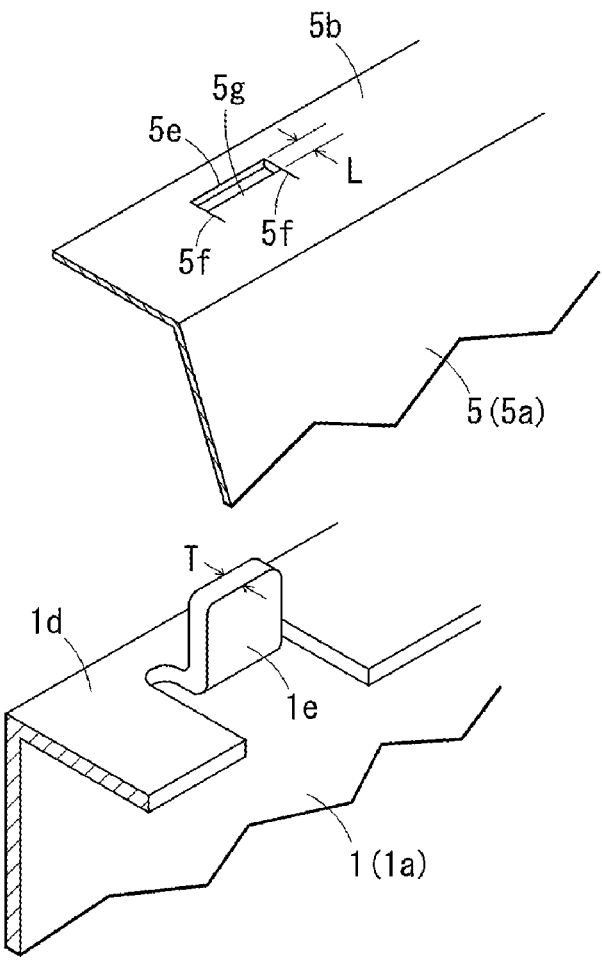
FIG. 9 is a partial exploded perspective view illustrating a first fixture.
Figure 10:
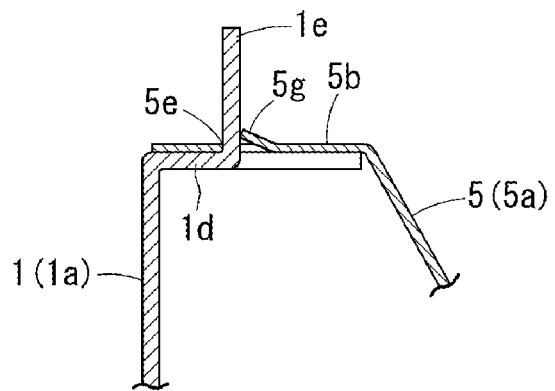
FIG. 10 is a partial cross-sectional view illustrating the first fixture where an upper edge portion of a cover made of a light reflective sheet is fixed to a support plate portion of a rear frame.

In the liquid crystal module according to this embodiment, as shown in FIG. 9, the length L of the short side of the rectangular hole 5e is slightly smaller than the thickness T of the protruding piece 1e so that the protruding piece 1e can be press-fitted into the rectangular hole 5e. In addition, the rectangular hole 5e is provided with notches 5f extending in a short side direction of the rectangular hole 5e from both ends of the rectangular hole 5e in a long side direction of the rectangular hole 5e. With this configuration, as shown in FIG. 10, when the protruding piece 1e is inserted into the rectangular hole 5e, a hole edge portion 5g of the rectangular hole 5e formed with the notch can be upwardly deformed. Therefore, the protruding piece 1e can be easily press-fitted into the rectangular hole 5e and firmly fixed to the upper edge portion 5b of the cover 5. And thus, the protruding piece 1e is prevented from being released (detached) from the rectangular hole 5e.

Figure 11:
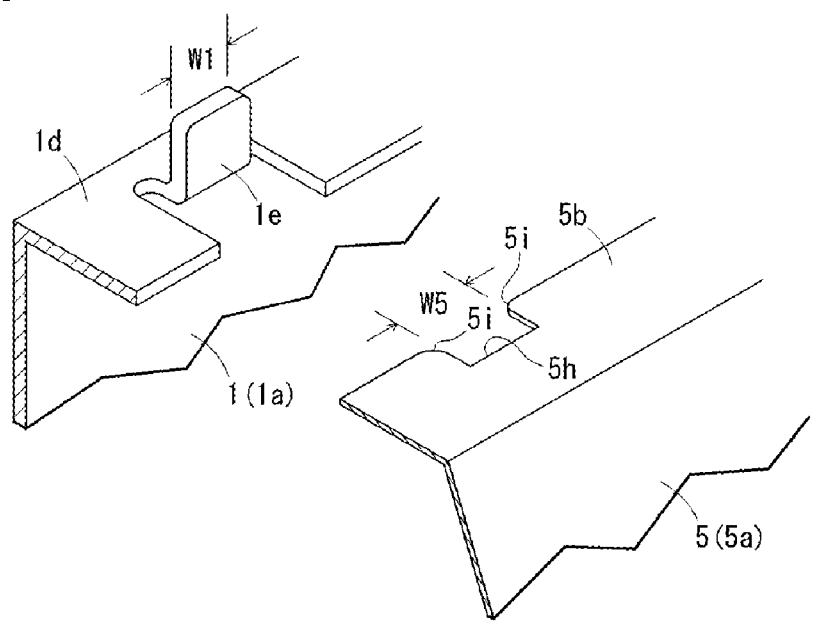
FIG. 11 is a partial exploded perspective view illustrating a second fixture.

The upper edge portion 5b of the cover 5 may be fixed to the support plate portion 1d of the rear frame by a second fixing means, as shown in FIG. 11. The second fixing means has a protruding piece 1e which is formed on the support plate portion 1d of the rear frame 1 and protruded upwardly from the support plate portion 1d of the rear frame 1 and a rectangular concave cutout portion 5h which is formed at an outer end of the upper edge portion 5b of the cover 5. The protruding piece 1e is fitted into the concave cutout portion 5h so that the upper edge portion 5b of the cover 5 is fixed to the support plate portion 1d of the rear frame 1.

In the second fixing means, the width W5 of the concave cutout portion 5h is slightly smaller than the width W1 of the protruding piece 1e so that the protruding piece 1e can be press-fitted into the concave cutout portion 5h. In addition, both sides of an opened end of the concave cutout portion 5h are chamfered to form round portions 5i for receiving the protruding piece 1e. Accordingly, the protruding piece 1e can be smoothly fixed and fitted into the concave cutout portion 5h, thereby improving the fixing strength and the fixing (fitting) workability. The upper edge portion 5b of the cover 5 may be fixed and attached to the support plate portion 1d of the rear frame 1 by double-sided tape or the like, in addition to the second fixing means to further improve the fixing strength.

Figure 12:
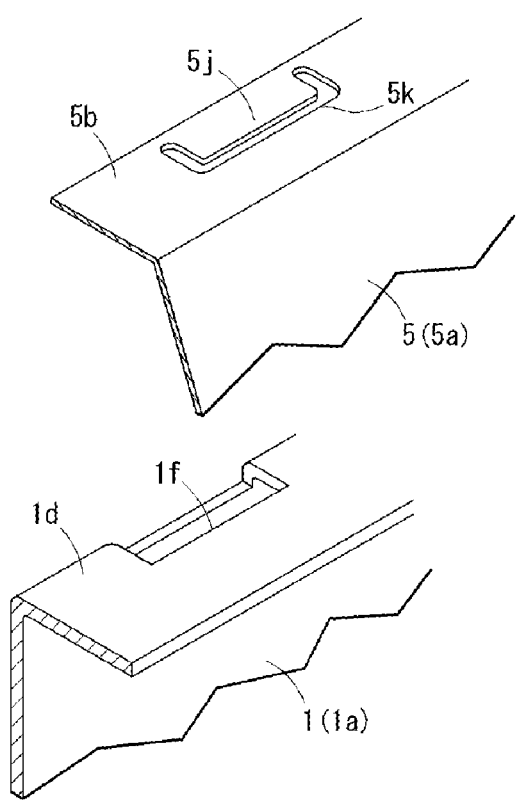
FIG. 12 is a partial exploded perspective view illustrating a third fixture.
Figure 13:
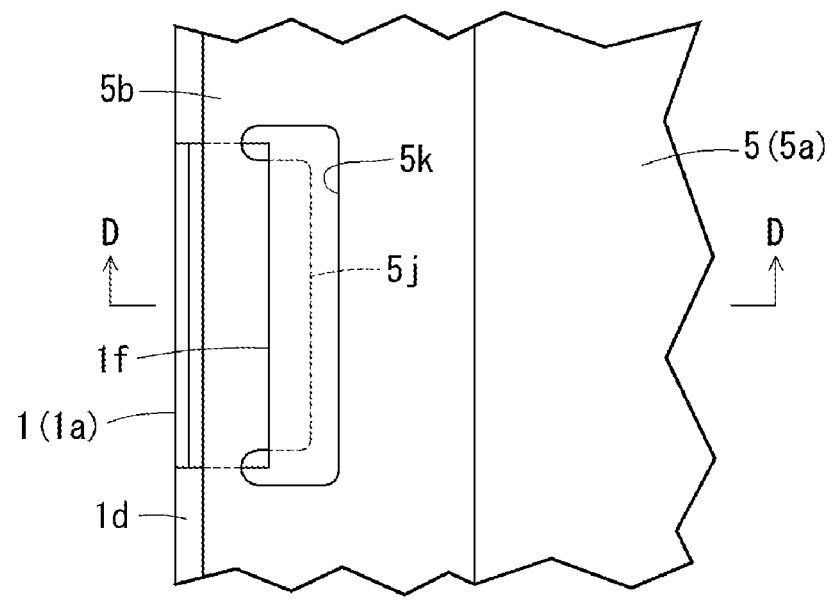
FIG. 13 is a partial top plan view illustrating the third fixture where an upper edge portion of a cover made of a light reflective sheet is fixed to a support plate portion of a rear frame.
Figure 14:
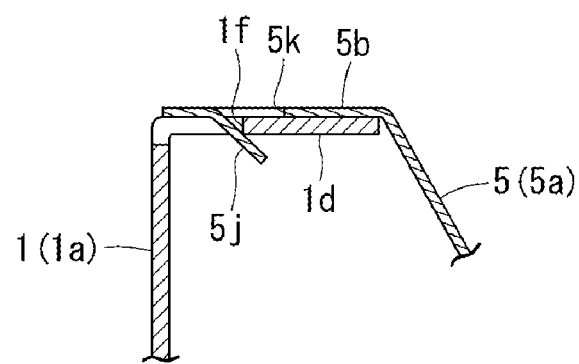
FIG. 14 is a partial cross-sectional view illustrating the third fixture where the upper edge portion of the cover made of the light reflective sheet is fixed to the support plate portion of the rear frame.

The upper edge portion 5b of the cover 5 may be fixed to the support plate portion 1d of the rear frame 1 by a third fixing means, as shown in FIGS. 12 and 13. The third fixing means includes a tab piece 5j. This tub piece 5j can be formed by forming a U-shaped slit portion 5k at the upper edge portion 5b of the cover 5. The slit portion 5k extends in a longitudinal direction of the upper edge portion 5b and has both ends which are bent outwardly. The third fixing means further includes a rectangular opening 1f formed in the support plate portion 1d of the rear frame 1. As shown in FIGS. 13 and 14, the tab piece 5j is inserted below the support plate portion 1d of the rear frame 1 through the opening 1f of the support plate portion 1d so that the upper edge portion 5b of the cover 5 is fixed to the support plate portion 1d of the rear frame 1. In the third fixing means, the tab piece 5j can be easily inserted into the opening 1f and the upper edge portion 5b of the cover 5 can be reliably fixed since the tab piece 5j is not easily released from the opening 1f.

As shown in FIGS. 1 and 6, the support plate portion 1d of the rear frame 1 is provided with first uprising pieces 1g for positioning the liquid crystal panel 9. Corresponding to these first uprising pieces 1g, the upper edge portion 5b of the cover 5 is provided with second uprising pieces 5m. The second uprising piece 5m is overlapped with an inner surface of the corresponding first uprising piece 1g, as shown in FIG. 4. The left and right edge portions of the liquid crystal panel 9 are adjacent to the second uprising pieces 5m, and are positioned in left and right direction by the first uprising pieces 1g through the second uprising pieces 5m. If the left and right edge portions of the liquid crystal panel 9 are positioned in this way, since the left and right edge portions of the liquid crystal panel 9 do not come into direct contact with the first uprising pieces 1g made of sheet metal, it is possible to prevent the edge portions of the liquid crystal panel 9 from being damaged due to the first uprising pieces 1g. In addition, the left and right edge portions of the optical sheets 6a and 6b are also positioned by the first uprising pieces 1g. In this case, the upper edge portion and the lower edge portion of the liquid crystal panel 9 are positioned by positioning bosses 8a protruded from both ends of the cell guide 8, as shown in FIGS. 1 and 5.

The left and right edge portions of the liquid crystal panel 9 are disposed on the band-shape spacer 7 having the light shielding property as mentioned above in this embodiment. The cell guide may be used instead of the spacer 7. In this case, the cell guide presses the left and right end portions of the optical sheets 6a and 6b and supports the left and right edge portions of the liquid crystal panel 9. However, in the case where the left and right edge portions of the liquid crystal panel 9 are supported by the spacer 7 having the light shielding property as like this embodiment, since the spacer 7 is inexpensive, it is possible to lower costs. In addition, since the spacer 7 has the light shielding property, it is possible to prevent light from leaking from the left and right edge portions of the liquid crystal panel 9.

In the above-described liquid crystal module, since the end portions of the U-shaped cold cathode tubes 3 are concealed by the covers 5 and 5 which are provided in the left and right side plates 1a of the rear frame 1, it is possible to prevent variation in brightness from occurring at both left and right side portions of the display surface of the liquid crystal panel 9. In addition, since the cover 5 made of the light reflective sheet costs significantly less than the lamp frame and the cover 5 has the excellent light reflectivity, it is possible to lower the cost of the liquid crystal module and improve the brightness at both left and right side portions of the display surface of the liquid crystal panel 9. Moreover, since the lower end portion of the cover 5 can be fixed by inserting the insertion pieces 5c of the cover 5 between the bottom plate 1b of the rear frame 1 and the light reflective sheet 2 through the cut portions 2a formed at both left and right end portions of the light reflective sheet 2 which is provided at the bottom plate 1b of the rear frame 1, it is very easy to fix the lower end portion of the cover 5 to the rear frame 1 and it is possible to firmly fix the lower end portion of the cover 5. Further, since the upper edge portion 5b of the cover 5 is simply and reliably fixed to the support plate portion 1d of the rear frame 1 by the above-mentioned first, second and third fixing means, there are some positive effects in that the fixing (assembly) workability of the cover 5 made of the light reflective sheet become good without no concerns that the cover 5 may be released (detached) from the rear frame 1.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A liquid crystal module, comprising:
a rear frame;
a light reflective sheet provided on a bottom plate of the rear frame;
a cold cathode tube provided on the light reflective sheet in the rear frame;
a pair of left and right covers made of the light reflective sheet and disposed inside left and right side plates of the rear frame to cover over both end portions of the cold cathode tube,
wherein each of the covers includes:
an inclined sheet portion inclined downwardly toward the inside of the rear frame;
an upper edge portion bent outwardly from an upper end of the inclined sheet portion; and
a insertion piece protruded inwardly from a lower end of the inclined sheet portion,
wherein the upper edge portion is mounted on a support plate portion provided in an upper end of each of the left and right side plates of the rear frame and fixed to the support plate portion with a fixture, and
wherein the insertion piece is inserted and fixed between the bottom plate of the rear frame and the light reflective sheet through a cut portion formed at each of left and right end portions of the light reflective sheet.

2. The liquid crystal module as set forth in claim 1, wherein the fixture includes a protrusion piece protruded upwardly from the support plate portion of the rear frame and a rectangular hole formed on the upper edge portion of the covers, and
wherein the protrusion piece is inserted into the rectangular hole from below so that the upper edge portion of the covers is fixed to the support plate portion of the rear frame.

3. The liquid crystal module as set forth in claim 2, wherein the length of a short side of the rectangular hole is slightly smaller than the thickness of the protrusion piece so that the protrusion piece is press-fitted into the rectangular hole from below.

4. The liquid crystal module as set forth in claim 3, wherein the rectangular hole is provided with notches extending in a short side direction of the rectangular hole from both ends of the rectangular hole in a long side direction of the rectangular hole.

5. The liquid crystal module as set forth in claim 1,
wherein the fixture includes a protrusion piece protruded upwardly from the support plate portion of the rear frame and a concave cutout portion formed at outer end of the upper edge portion of the covers, and
wherein the protrusion piece is fitted into the concave cutout portion so that the upper edge portion of the covers is fixed to the support plate portion of the rear frame.

6. The liquid crystal module as set forth in claim 5, wherein the width of the concave cutout portion is slightly smaller than the width of the protrusion piece so that the protrusion piece is press-fitted into the concave cutout portion.

7. The liquid crystal module as set forth in claim 5, wherein both sides of an opened end of the concave cutout portion are chamfered for fitting the protrusion piece into the concave cutout portion.

8. The liquid crystal module as set forth in claim 1,
wherein the fixture includes a rectangular opening formed in the support plate portion of the rear frame and a tub piece formed in the upper edge portion of the covers by forming a slit portion at the upper edge portion of the covers, the slit portion extending in a longitudinal direction of the upper edge portion and having both ends bent outwardly, and
wherein the tub piece is inserted below the support plate portion of the rear frame through the rectangular opening so that the upper edge portion of the covers is fixed to the support plate portion of the rear frame.

9. The liquid crystal module as set forth in claim 1, further comprising:
an optical sheet overlapped with the upper edge portion of the covers;
a spacer provided on left and right edge portions of the optical sheet; and
a liquid crystal panel overlapped with the optical sheet through the spacer,
wherein the support plate portion of the rear frame is provided with a first uprising piece and the upper edge portion of the covers is provided with a second uprising piece overlapped with an inner surface of the first uprising piece,
wherein the liquid crystal panel is positioned in left and right direction by the first uprising piece through the second uprising piece.

* * * * *